United States Patent
Iwasaki et al.

(10) Patent No.: US 9,805,840 B2
(45) Date of Patent: Oct. 31, 2017

(54) HALOGEN-FREE CROSSLINKED RESIN COMPOSITION AND INSULATED WIRE AND CABLE USING THE SAME

(71) Applicant: Hitachi Metals, Ltd., Tokyo (JP)

(72) Inventors: Makoto Iwasaki, Hitachi (JP); Hitoshi Kimura, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 408 days.

(21) Appl. No.: 14/084,364

(22) Filed: Nov. 19, 2013

(65) Prior Publication Data

US 2014/0141245 A1   May 22, 2014

(30) Foreign Application Priority Data

Nov. 20, 2012   (JP) .................. 2012-254741

(51) Int. Cl.
*H01B 3/44* (2006.01)
*H01B 3/46* (2006.01)
(Continued)

(52) U.S. Cl.
CPC .......... *H01B 3/446* (2013.01); *C08L 23/0853* (2013.01); *H01B 3/441* (2013.01);
(Continued)

(58) Field of Classification Search
CPC .......... H01B 3/30; H01B 7/295; H01B 3/441; H01B 3/446; H01B 3/448; H01B 3/46;
(Continued)

(56) References Cited

U.S. PATENT DOCUMENTS 6,133,367 A * 10/2000 Arhart .................. C08L 23/08
524/515
6,277,908 B1 * 8/2001 Yamamoto .............. C08K 3/22
524/269
(Continued)

FOREIGN PATENT DOCUMENTS

JP   03-045638 A   2/1991
JP   2002-042574 A   2/2002
(Continued)

OTHER PUBLICATIONS

Lucobit Thermoplastic Polyolefins, www.lucobit.de/icoaster/files/brochure_foam_1013.pdf, copyright 2015, pp. 1-2.*
(Continued)

*Primary Examiner* — Scott R Walshon
(74) *Attorney, Agent, or Firm* — McGinn IP Law Group, PLLC

(57) ABSTRACT

A halogen-free crosslinked resin composition includes a base polymer including as a main component (a) an ethylene vinyl acetate copolymer and (b) an acid modified polyolefin resin having a differential scanning calorimetry glass transition temperature Tg of not higher than −55 degrees Celsius in a mass ratio (a):(b) of 70:30 to 100:0, the base polymer including 50 to 70% by mass of vinyl acetate, 0.5 to 10 parts by mass of a silicone rubber with respect to 100 parts by mass of the base polymer, and 100 to 250 parts by mass of a metal hydroxide with respect to 100 parts by mass of the base polymer.

20 Claims, 1 Drawing Sheet

(51) Int. Cl.
*C08L 23/08* (2006.01)
*C08K 3/22* (2006.01)
*C08L 19/00* (2006.01)
*C08K 3/00* (2006.01)

(52) U.S. Cl.
CPC ............... *H01B 3/448* (2013.01); *H01B 3/46* (2013.01); *C08K 3/0058* (2013.01); *C08K 3/22* (2013.01); *C08L 19/00* (2013.01); *Y10T 428/2962* (2015.01)

(58) Field of Classification Search
CPC . H01B 3/465; H01B 3/44; C08K 3/22; C08K 2003/2224; C08K 3/36; C08K 2201/003; C08K 2201/006; C08K 2003/2217; C08K 3/0056; Y10T 428/2933; Y10T 428/294; Y10T 428/2947; Y10T 428/2958; Y10T 428/2927; C08L 23/02; C08L 23/0853; C08L 31/04; C08L 23/08; C08L 23/16; C08L 51/00; C08L 2205/03; C08L 2666/02; C08L 23/0815; C08L 23/10; C08L 23/14; C08L 51/06; C08L 2201/02; C08L 2203/202; C08L 2314/06
USPC .............. 428/379, 372, 383, 389; 174/110 A, 174/110 PM, 110 R, 121 AR, 5 R, 137 B; 524/451, 522, 523, 524, 436, 216, 414, 524/437, 495, 504, 424, 425; 525/240, 525/323, 100, 285; 264/349, 564, 211.23, 264/211, 331.11
See application file for complete search history.

(56) References Cited

U.S. PATENT DOCUMENTS

| | | | |
|---|---|---|---|
| 6,627,819 | B2 | 9/2003 | Hashimoto et al. |
| 6,924,031 | B2* | 8/2005 | Grizante Redondo . C08L 23/06 174/110 A |
| 2002/0033272 | A1 | 3/2002 | Hashimoto et al. |
| 2014/0030520 | A1* | 1/2014 | Nakamura ............. H01B 7/295 428/368 |

FOREIGN PATENT DOCUMENTS

| | | |
|---|---|---|
| JP | 2002-241548 A | 8/2002 |
| JP | 2007-161814 A | 6/2007 |
| JP | 2010-084103 A | 4/2010 |

OTHER PUBLICATIONS

Japanese Office Action dated May 26, 2015 with an English Translation therof.
Chinese Office Action dated Jul. 4, 2016 and English translation thereof.

* cited by examiner ized in the Japanese Patent Application Laid-Open No. JP-A-2010-97881.

HALOGEN-FREE CROSSLINKED RESIN COMPOSITION AND INSULATED WIRE AND CABLE USING THE SAME

The present application is based on Japanese patent application No. 2012-254741 filed on Nov. 20, 2012, the entire contents of which are incorporated herein by reference.

BACKGROUND OF THE INVENTION

1. Field of the Invention

This invention relates to a halogen-free crosslinked resin composition, which has flame retardancy, as well as an electrically insulated wire (insulated wire) and a cable covered with that halogen-free crosslinked resin composition (in particular, an insulated wire for vehicle and a cable for vehicle).

2. Description of the Related Art

Awareness of environmental issues has been increasing worldwide, and there has been a demand for use of a so-called halogen-free material, which is free from halogen gas emissions when burnt, for an insulated wire and a cable. For example, an insulated wire using a halogen-free flame retardant such as a metal hydroxide or the like is known as disclosed by JP-A-2010-97881.

In order to achieve high flame retardancy enough to suppress the propagation of flames during a fire, it is necessary to fully fill such a halogen-free flame retardant, but there has been such a problem that fully filling thereof lowers mechanical properties and also lowers melt flow properties, thereby constrains a molding machine.

Meanwhile, the insulated wires and cables to be used in railroad vehicles, automobile vehicles or the like are required to have high oil resistance and low temperature properties, depending on an environment for the use.

It has been known that a polymer having high crystallinity or a polymer having high polarity may be used in order to achieve the high oil resistance. Also, it has been known that a material having low glass transition temperature (Tg) may be used in order to achieve low temperature properties.

SUMMARY OF THE INVENTION

However, the use of the polymer having high crystallinity in order to achieve high oil resistance has the drawback of wiring property worsening in application to an insulated wire and a cable, due to flexibility lowering.

Further, the polymer having high polarity, such as an ethylene vinyl acetate copolymer (EVA) having a vinyl acetate content (VA amount) of not less than 50% by mass, has the drawback of low temperature property degradation, due to high Tg, while the EVA has excellent oil resistance with maintaining the flexibility at ordinary temperature.

In addition, the EVA having a large VA amount has the drawback of such a phenomenon (Hereinafter referred to as "die residue") that residue material of the EVA comes around a die and accumulates there during extrusion molding, since the EVA has high adhesion at ordinary temperature and when molten. The adhesion of die residue to the surface of an electric wire or cable worsens appearance thereof. In addition, the EVA having a large VA amount has the drawback that electric wires or cables after molding are sticking together since the EVA having a large VA amount is sticky.

In view of the above drawbacks, it is an object of the present invention to provide a halogen-free crosslinked resin composition, which has flame retardancy and excellent mechanical properties, achieves both high oil resistance and excellent low temperature properties, and prevents die residue or self-sticking of a wire or cable.

It is another object of the present invention to provide an insulated wire (in particular, an electrically insulated wire for vehicle), which is covered with that halogen-free crosslinked resin composition.

It is still another object of the present invention to provide a cable (in particular, a cable for vehicle), which is covered with that halogen-free crosslinked resin composition.

To achieve the above objects, according to the present invention, a halogen-free crosslinked resin composition below and an insulated wire and a cable below are provided.

(1) According to a first embodiment of the invention, a halogen-free crosslinked resin composition comprises:
  a base polymer including as a main component (a) an ethylene vinyl acetate copolymer and (b) an acid modified polyolefin resin having a differential scanning calorimetry glass transition temperature Tg of not higher than −55 degrees Celsius in a mass ratio (a):(b) of 70:30 to 100:0, the base polymer including 50 to 70% by mass of vinyl acetate;
  0.5 to 10 parts by mass of a silicone rubber with respect to 100 parts by mass of the base polymer; and
  100 to 250 parts by mass of a metal hydroxide with respect to 100 parts by mass of the base polymer.

In the first embodiment, the following modifications and changes can be made.

The ethylene vinyl acetate copolymer comprises two or more kinds of ethylene vinyl acetate copolymers which are different in melt mass flow rate, and 5 to 20% by mass of the ethylene vinyl acetate copolymer has a melt mass flow rate of not less than 15 g/10 min.

(2) According to a second embodiment of the invention, an insulated wire is covered with an insulating layer comprising the above halogen-free crosslinked resin composition.

(3) According to a third embodiment of the invention, a cable includes the above insulated wire.

(4) According to a fourth embodiment of the invention, a cable is covered with a sheath comprising the above halogen-free crosslinked resin composition.

Points of the Invention

According to the present invention, it is possible to provide the halogen-free crosslinked resin composition, which has flame retardancy and excellent mechanical properties, achieves both high oil resistance and excellent low temperature properties, and prevents die residue or self-sticking of a wire or cable. It is also possible to provide the insulated wire and the cable covered with that halogen-free crosslinked resin composition.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Next, a halogen-free crosslinked resin composition and an insulated wire and a cable using the same in one embodiment according to the invention will be explained in conjunction with the accompanying drawings.

(Insulated Wire)

Figure 1:
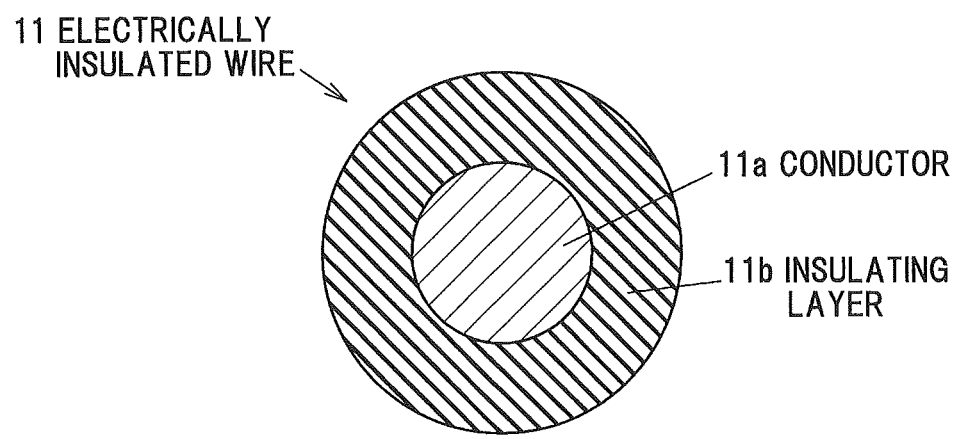
FIG. 1 is a cross sectional view showing an insulated wire in one embodiment according to the present invention.

FIG. 1 is a cross sectional view showing an insulated wire in one embodiment according to the present invention.

As shown in FIG. 1, an electrically insulated wire (insulated wire) 11 in the present embodiment includes a conductor 11a made of a versatile material such as tin-plated copper or the like, and an insulating layer 11b formed around an outer periphery of the conductor 11a.

The insulating layer 11b comprises a halogen-free crosslinked resin composition including 0.5 to 10 parts by mass of silicone rubber, and 100 to 250 parts by mass of metal hydroxide, with respect to 100 parts by mass of base polymer.

The base polymer of the halogen-free crosslinked resin composition includes, as a main component, (a) ethylene vinyl acetate copolymer (EVA) and (b) acid modified polyolefin resin having a DSC (differential scanning calorimetry) glass transition temperature (Tg) of not higher than −55 degrees Celsius in a mass ratio (a):(b) of 70:30 to 100:0. A vinyl acetate content (VA amount) of the base polymer is 50 to 70% by mass.

In general, when the kinds of polymers used for the base polymer is of 1, 2, 3, . . . k, . . . n, the VA amount in the base polymer is derived by the following formula (1):

$$(VA \text{ amount in the base polymer}) = \sum_{k=1}^{n} X_k Y_k \quad (1)$$

In the above formula (1), X represents the VA amount (percent by mass), and Y represents the proportion of the polymer k in the entire base polymers, and k represents a natural number.

In the present embodiment, when the VA amount in the base polymer of the halogen-free crosslinked resin composition used is less than 50% by mass, no oil resistance can be satisfied, while when it exceeds 70% by mass, no low temperature properties can be achieved. In addition, the EVA causes heat absorption due to acetic acid elimination during combustion. Therefore, when the VA amount is low, the flame retardancy tends to lower.

In the present embodiment, it is preferable that the (a) EVA, which is one of the constituents of the base polymer comprises two or more kinds which are different in melt mass flow rate (MFR), and that 5 to 20% by mass of the EVA has a melt mass flow rate (MFR) of not less than 15 g/10 min. More preferably, 5 to 15% by mass, still more preferably, 5 to 10% by mass of the EVA has a melt mass flow rate (MFR) of not less than 15 g/10 min. The reason for determining the above ranges is that the melt flow properties and productivity can be enhanced by setting the EVA content with the high MFR in these ranges. That is, when the MFRs of all the EVAs to be used are less than 15 g/10 min, the delivery capacity of the extrusion molding may be low, and the productivity may be low. When the amount of the EVA having an MFR of not smaller than 15 g/10 min is less than 5% by mass, the delivery capacity of the extrusion molding may be low, and the productivity may be low. When the amount of the EVA having an MFR of not smaller than 15 g/10 min exceeds 20% by mass, the melting adherence of the resin composition may be intense, and extraction from a batch kneader such as a kneader or the like will be difficult. Also, the VA content of the EVA having an MFR of not smaller than 15 g/10 min is not particularly limited, but the VA amount in the entire base polymer may be 50 to 70% by mass.

Furthermore, when the content of (b) acid-modified polyolefin resin, which is one of the other components of the base polymer with respect to the total mass ratio of (a) ethylene vinyl acetate copolymer (EVA) and (b) the acid-modified polyolefin resin exceeds 30% by mass, namely the mass ratio of (a) EVA and (b) acid-modified polyolefin resin goes beyond the scope where (a):(b)=70:30 to 100:0, the oil resistance will be deteriorated. Preferably, the mass ratio (a):(b) is 70:30 to 90:10, and more preferably, the mass ratio (a):(b) is 80:20 to 10:90. Further, when (b) acid-modified polyolefin resin having Tg of higher than −55 degrees Celsius is used, low temperature properties will be deteriorated. The acid-modified polyolefin resin having Tg of not more than −55 degrees Celsius is not particularly limited, but it is preferable to use the acid-modified polyolefin resin with low crystallinity has a good flexibility and preferably has a melting point of not more than 90 degrees Celsius as a target. Specifically, ultra-low density polyethylene, ethylene methyl acrylate copolymer, ethylene ethyl acrylate copolymer, ethylene-butene-1 copolymer, ethylene-hexene-1 copolymer, ethylene-octene-1 copolymer and the like, which are respectively acid-modified, may be used. These copolymers may be used in combination. Further, since the low temperature properties can be enhanced by improving the adhesion with the metal hydroxide, the acid-modification is effective. As the acid, maleic acid, maleic anhydride, fumaric acid, or the like may be used.

In the present embodiment, the base polymer may contain the polymer components other than (a) ethylene vinyl acetate copolymer (EVA) and (b) acid-modified polyolefin resin, as long as the base polymer exhibits the aforementioned effects.

In the present embodiment, when the additive amount of silicone rubber, which is one of the additive materials to the base polymer, is less than 0.5 parts by mass, the die residue or the self-sticking of a wire or cable may occur. When the additive amount of the silicone rubber exceeds 10 parts by mass, the tensile strength will be reduced. The silicone rubber is preferably contained in an amount of 0.5 to 7.5 parts by mass with respect to the base polymer 100 parts by mass, more preferably, in an amount of 0.5 to 5 parts by mass with respect to the base polymer 100 parts by mass.

As the silicone rubber used in the present embodiment, dimethyl polysiloxane, methyl vinyl polysiloxane, methyl phenyl polysiloxane and the like may be used. It is possible to prevent the die residue and the self-sticking of a wire or cable, since the silicone rubber has a bad compatibility with EVA and transfers to the surface layer portion of the materials after kneading.

As the crosslinking method used in the present embodiment, there are chemical crosslinking by sulfur compounds or organic peroxides, irradiation crosslinking by electron beam, radiation and the like, crosslinking using other chemical reactions, etc., and either crosslinking method is applicable.

In the present embodiment, when the content of metal hydroxide, which is one of the other additive materials to the base polymer, is less than 100 parts by mass, it will be impossible to obtain a sufficient flame retardancy, and when it exceeds 250 parts by mass, the temperature property will not be ensured. Therefore, the metal hydroxide is preferably contained in an amount of 100 to 200 parts by mass with respect to 100 parts by mass of the base polymer, more preferably contained in an amount of 100 to 150 parts by mass with respect to 100 parts by mass of the base polymer.

As the metal hydroxide used in the present embodiment, e.g. aluminum hydroxide, magnesium hydroxide, calcium hydroxide and the like may be used. While the endothermic amount of the calcium hydroxide during decomposition is about 1000 J/g, the endothermic amount of each of the aluminum hydroxide and the magnesium hydroxide is as high as 1500 to 1600 J/g, and the flame retardancy thereof is good. Therefore, the aluminum hydroxide and the magnesium hydroxide are preferably used. The flame retardants may be surface-treated by silane coupling agent, titanate-based coupling agent, fatty acids such as stearic acid with considering the dispersibility and the like.

To the halogen-free crosslinked resin composition comprising the aforementioned materials, if necessary, crosslinking aids, flame retardant aids, UV absorbers, light stabilizers, softeners, lubricants, colorants, reinforcing agents, surfactants, inorganic fillers, plasticizers, metal chelating agents, blowing agents, compatibilizers, processing aids, stabilizers and the like may be added.

In the present embodiment, the insulating layer may be a single layer or may have a multilayer structure. Specifically, the multilayer structure is, e.g., a structure obtained by extrusion-coating of a polyolefin resin as layers other than the outermost layer and the halogen-free crosslinked resin composition as the outermost layer. Examples of the polyolefin resin include low-density polyethylene, EVA, ethylene ethyl acrylate copolymer, ethylene methyl acrylate copolymer, ethylene-glycidyl methacrylate copolymer and maleic anhydride polyolefin, etc., which can be used alone or as a mixture of two or more. A separator or a braid, etc., may be further provided, if required.

Rubber materials are also applicable as a material used for the insulating layers other than the outermost layer. Examples thereof include ethylene-propylene copolymer rubber (EPR), ethylene-propylene-diene terpolymer rubber (EPDM), acrylonitrile butadiene rubber (NBR), hydrogenated NBR (HNBR), acrylic rubber, ethylene-acrylic ester copolymer rubber, ethylene-octene copolymer rubber (EOR), ethylene-vinyl acetate copolymer rubber, ethylene-butene-1 copolymer rubber (EBR), butadiene-styrene copolymer rubber (SBR), isobutylene-isoprene copolymer rubber (IIR), block copolymer rubber having a polystyrene block, urethane rubber and phosphazene rubber, etc., which can be used alone or as a mixture of two or more.

In addition, the material of the insulating layers other than the outermost layer is not limited to the polyolefin resins and rubber materials listed above, and not specifically limited as long as insulating properties are obtained. To the materials of the insulating layers, if necessary, flame retardants, flame retardant aids, crosslinking agents, crosslinking aids, UV absorbers, light stabilizers, softeners, lubricants, colorants, reinforcing agents, surfactants, antioxidants, inorganic fillers, coupling agents, plasticizers, metal chelating agents, blowing agents, compatibilizers, processing aids, stabilizers and the like may be added. As the crosslinking processing, there are chemical crosslinking by sulfur compounds or organic peroxides, irradiation crosslinking by electron beam, radiation and the like, crosslinking using other chemical reactions, etc., and either crosslinking method is applicable.

(Cable)

Figure 2:
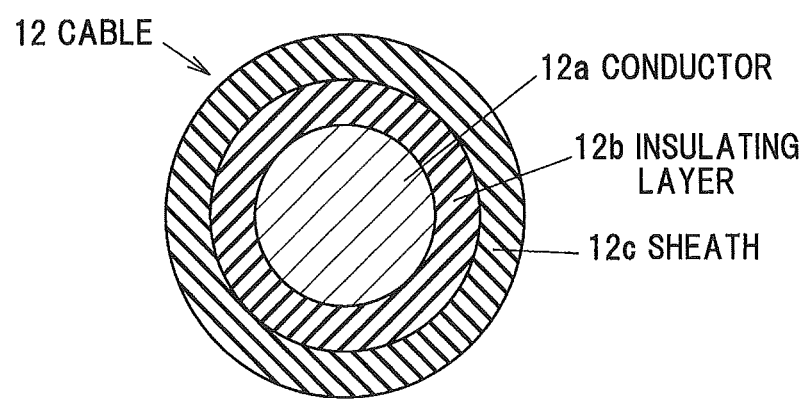
FIG. 2 is a cross sectional view showing a cable in one embodiment according to the present invention.

FIG. 2 is a cross sectional view showing a cable in one embodiment according to the present invention.

As shown in FIG. 2, a cable 12 in the present embodiment comprises a conductor 12a essentially made of a versatile material such as tin-plated copper, an insulating layer 12b formed around an outer periphery of the conductor 12a, and a sheath 3 formed around an outer periphery of the insulating layer 12b.

For example, the insulating layer 12b comprises at least one polymer selected from the group consisting of ethylene-butene-1 copolymer rubber, polybutylene naphthalate, polybutylene terephthalate, polyphenylene oxide, and polyetheretherketone. The insulating layer 12 b may comprise a halogen-free crosslinked resin composition as described above.

In the present embodiment, the sheath 3 may be a single layer or may have a multilayer structure. Specifically, the multilayer structure is, e.g., a structure obtained by extrusion-coating of a polyolefin resin as layers other than the outermost layer and the halogen-free resin composition as the outermost layer. Examples of the polyolefin resin include low-density polyethylene, EVA, ethylene ethyl acrylate copolymer, ethylene methyl acrylate copolymer, ethylene-glycidyl methacrylate copolymer and maleic anhydride polyolefin, etc., which can be used alone or as a mixture of two or more. A separator or a braid, etc., may be further provided, if required.

(Halogen-Free Crosslinked Resin Composition)

A halogen-free crosslinked resin composition in the present embodiment according to the invention includes a base polymer including as a main component (a) ethylene vinyl acetate copolymer (EVA) and (b) acid modified polyolefin resin having DSC (differential scanning calorimetry) glass transition temperature (Tg) of not higher than −55 degrees Celsius in a mass ratio (a):(b) of 70:30 to 100:0, the base polymer including 50 to 70% by mass of vinyl acetate, 0.5 to 10 parts by mass of a silicone rubber with respect to 100 parts by mass of the base polymer, and 100 to 250 parts by mass of a metal hydroxide with respect to 100 parts by mass of the base polymer. The details of the halogen-free crosslinked resin composition are as described above.

The halogen-free crosslinked resin composition in the embodiment according to the present invention can be used for various applications. Further, since the halogen-free crosslinked resin composition has flame retardancy and excellent mechanical properties, achieves both high oil resistance and excellent low temperature properties, and prevents die residue or the self-sticking of a wire or cable, it can be suitably used for the insulating layer of the insulated wire and the cable sheath. In particular, it can be suitably used for the insulated wire for vehicles and the cable for vehicles.

EXAMPLES

The cable according to the present invention will more specifically be described below by way of Examples. In addition, the present invention is in no way limited by the following examples.

Example 1

The cable shown in FIG. 2 is produced as follows. Namely, eighty 0.40 mm tin-plated copper wires were used as the conductor, and a resin composition with 2 parts by mass of organic peroxide (NOF Corporation, trade name: PERBUTYL P) (PERBUTYL is a registered trademark) added to 100 parts by mass of ethylene butene-1 copolymer rubber (Mitsui Chemicals, Inc., trade name: TAFMER A-4050S) was used as the insulating layer. A halogen-free crosslinked resin composition comprising compounding materials shown in Table 1 was used as the sheath. These resin compositions were coated around an outer periphery of the conductor by two-layer extrusion with a 4.5 inch continuous steam crosslinking extruder, so that the thickness of the insulating layer was 0.45 mm, also the thickness of the sheath was 1.67 mm, and the outer diameter was 8.60 mm. Crosslinking was performed for 3 minutes using 1.8 MPa high pressure steam, to provide a cable. In addition, the EVAs of 1 to 3 in Table 1 are the EVAs with MFR of less than 15 g/10 min.

In this case, as a material for the halogen-free crosslinked resin composition constituting the sheath, a mixture of 100 parts by mass of EVA (VA: 60% by mass) (LANXESS Corp., trade name: LEVAPREN 600) (LEVAPREN is a registered trademark), 5 parts by mass of silicone rubber (dimethyl polysiloxane, Shin-Etsu chemical Co., Ltd., trade name: KE76), 2 parts by mass of organic peroxide (NOF Corp., trade name: PERBUTYL P) (PERBUTYL is a registered trademark), and 100 parts by mass of magnesium hydroxide (Kyowa chemical Industry Co., Ltd., trade name: KISUMA 5L) (KISUMA is a registered trademark) was used.

Further, the insulated wire in the embodiment according to the present invention shown in FIG. 1 is produced in the same manner instead of the sheath in the cable shown in FIG. 2, by using the insulating layer made of the halogen-free crosslinked resin composition comprising the compounding materials shown in Table 1. The rated result was that the advantageous effects of the present invention were achieved.

The resulting cable was rated by rating tests of each kind shown below which are required especially for railroad vehicle applications. Its rated results are shown in Table 1.

(Rating Test)

(Rating of Kneadability)

The compounding materials for the sheath shown in Table 1 were kneaded at a set temperature of 50 degrees Celsius with a 25 L kneader. After the temperature elevated to 150 degrees Celsius by self-heating, a chamber was tilted. When the material naturally fell, the kneadability was rated as "Very good". When the material was manually droppable, the kneadability was rated as "Good". When no material could be scooped out, the kneadability was rated as "Poor."

(Rating of Extrusion Productivity)

At the time of covering the cable with the insulating layer and the sheath by two-layer extrusion with the 4.5 inch continuous steam crosslinking extruder, when the maximum pulling speed was not slower than 20 m/min, the extrusion productivity was rated as "Very good". When the maximum pulling speed was not slower than 1 m/min and slower than 20 m/min, the extrusion productivity was rated as "Good". When pulling could not be done at all, the extrusion productivity was rated as "Poor."

(Rating of Die Residue)

At the time of covering the cable with the insulating layer and the sheath by two-layer extrusion with the 4.5 inch continuous steam crosslinking extruder, a die after 100 m extrusion was visually observed to check for the presence of the die residue. When the die residue was found, it was rated as "Poor". When no die residue was found, it was rated as "Very good".

(Rating of Adherence)

At the time of covering the cable with the insulating layer and the sheath by two-layer extrusion with the 4.5 inch continuous steam crosslinking extruder, after 100 m extrusion, the cable was wound around a 450 mm diameter bobbin, and after 60 minutes, the cable was unwound. At the time of unwinding the cable, when the cable stuck to itself, its adherence was rated as "Poor". When the cable was neatly unwound without sticking to itself, its adherence was rated as "Very good".

(Rating of Flame Retardancy)

A vertical flame test was implemented in compliance with EN60332-1-2. A 550 mm cable was vertically supported and flamed at a position of 475 mm from a top for 60 seconds. After removal thereof, when the remaining flame self-extinguished in a range of 50 mm to 540 mm from the top, the flame retardancy was rated as "Very good". When the remaining flame exceeded the above range, the flame retardancy was rated as "Poor".

(Rating of Sheath)

The rating of the sheath was tested as follows by cutting the insulating layer, and punching a sheath portion into a No. 6 dumbbell specimen.

Tensile Strength Rating:

In compliance with EN60811-1-1, a tensile test was performed at a tension speed of 200 mm/min. When the tensile strength was not less than 10 MPa, it was rated as "Very good", and when the tensile strength was less than 10 MPa, it was rated as "Poor".

Oil Resistance Rating:

In compliance with EN60811-2-1, after immersion for 168 hours in test oil IRM903 heated to 70 degrees Celsius, a tensile test was performed. When the elongation change rate was not more than 40%, the oil resistance was rated as "Very good". When the elongation change rate was more than 40%, the oil resistance was rated as "Poor".

Low Temperature Property Rating:

In compliance with EN60811-1-4, when the elongation was not less than 30%, the low temperature properties were rated as "Very good". When the elongation was at −40 degrees Celsius less than 30%, the low temperature properties were rated as "Poor".

(Overall Rating)

For overall rating, when all of the ratings were determined as "Very good", the overall rating was determined as "Very good". When the ratings consist of "Very good" and "Good", the overall rating was determined as "Good". When even one of the ratings was determined as "Poor", the overall rating was determined as "Poor".

TABLE 1

Table 1
(Unit of compounding amount is parts by mass)

| Item | Example 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| EVA (VA amount: 46 mass %)[1] | | | | | 35 | 30 | 35 | 30 | 20 | 30 | 30 | 30 | 30 | 30 |
| EVA (VA amount: 60 mass %)[2] | 100 | | 85 | | | | | | | | | | | |

TABLE 1-continued

Table 1
(Unit of compounding amount is parts by mass)

| Item | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|
| EVA (VA amount: 80 mass %)[3] | | 70 | | 87 | 50 | 50 | 50 | 50 | 50 | 50 | 50 | 50 | 50 | 50 |
| EVA (VA amount: 46 mass %, MFR: 100 g/10 min)[4] | | | | | | | 5 | 10 | 20 | 10 | 10 | 10 | 10 | 10 |
| EVA (VA amount 46 mass %, MFR: 15 g/10 min)[5] | | | | | 5 | 10 | | | | | | | | |
| Acid-modified polyolefin (Tg: −55° C. or lower)[6] | | 30 | 15 | 13 | 10 | 10 | 10 | 10 | 10 | 10 | 10 | 10 | 10 | 10 |
| Silicon rubber[7] | 5 | 5 | 5 | 5 | 5 | 5 | 5 | 5 | 5 | 0.5 | 10 | 5 | 5 | 5 |
| Organic peroxide[8] | 2 | 2 | 2 | 2 | 2 | 2 | 2 | 2 | 2 | 2 | 2 | 2 | 2 | 2 |
| Magnesium hydroxide[9] | 100 | 100 | 100 | 100 | 100 | 100 | 100 | 100 | 100 | 100 | 100 | 250 | | |
| Aluminum hydroxide[10] | | | | | | | | | | | | | 100 | 250 |
| VA amount in base polymer (mass %) | 60 | 56 | 51 | 69.6 | 58.4 | 58.4 | 58.4 | 58.4 | 58.4 | 58.4 | 58.4 | 58.4 | 58.4 | 58.4 |
| Kneadability | Very good | Very good | Very good | Very good | Very good | Very good | Very good | Very good | Good | Very good | Good | Very good | Very good | Very good |
| Extrusion productivity | Good | Good | Good | Good | Very good | Very good | Very good | Very good | Very good | Very good | Very good | Good | Very good | Good |
| Presence/absence of die residue | Very good | Very good | Very good | Very good | Very good | Very good | Very good | Very good | Very good | Very good | Very good | Very good | Very good | Very good |
| Presence/absence of adherence | Very good | Very good | Very good | Very good | Very good | Very good | Very good | Very good | Very good | Very good | Very good | Very good | Very good | Very good |
| Flame retardancy | Very good | Very good | Very good | Very good | Very good | Very good | Very good | Very good | Very good | Very good | Very good | Very good | Very good | Very good |
| Tensile strength (MPa) | 11.4 | 13.0 | 12.3 | 12.0 | 12.1 | 12.0 | 11.9 | 12.0 | 12.0 | 13.5 | 10.6 | 13.1 | 11.5 | 12.9 |
| Rating | Very good | Very good | Very good | Very good | Very good | Very good | Very good | Very good | Very good | Very good | Very good | Very good | Very good | Very good |
| Oil resistance (%) | 18 | 27 | 33 | 8 | 25 | 25 | 25 | 25 | 25 | 25 | 25 | 18 | 25 | 18 |
| Rating | Very good | Very good | Very good | Very good | Very good | Very good | Very good | Very good | Very good | Very good | Very good | Very good | Very good | Very good |
| Low-temperature property (%) | 53 | 65 | 60 | 35 | 50 | 48 | 45 | 45 | 45 | 35 | 50 | 38 | 43 | 35 |
| Rating | Very good | Very good | Very good | Very good | Very good | Very good | Very good | Very good | Very good | Very good | Very good | Very good | Very good | Very good |
| Overall rating | Good | Good | Good | Good | Very good | Very good | Very good | Very good | Good | Very good | Good | Good | Very good | Good |

[1] Mitsui/DuPont, 45LX
[2] LANXESS, LEVAPREN 600
[3] LANXESS, LEVAPREN 800
[4] Mitsui/DuPont, 45X
[5] Mitsui/DuPont, EV550
[6] Mitsui Chemicals, TAFMER MH5040
[7] Shin-Etsu Chemical Co., Ltd, KE76
[8] NOF Corporation, PERBUTYL P
[9] Kyowa Chemical Industry Co., Ltd., KISUMA 5L
[10] Nippon Light Metal, BF013STV Examples 2 to 14

Cables in Examples 2 to 14 are produced in the same manner as in Example 1, except that the compounding materials for the sheath in Example 1 were changed to those shown in Examples 2 to 14 in Table 1.

In the same manner as in Example 1, the resulting cables were rated by the rating tests of each kind. The rated results are shown in Table 1.

As shown in Table 1, in Examples 1 to 4, the extrusion workability thereof was "Good" and the overall ratings thereof were "Good".

The kneadability in Examples 9 and 11, and the extrudability in Examples 12 and 14 were "Good", and the overall ratings of Examples 9, 11, 12 and 14 were "Good."

In Examples 5 to 8, 10 and 13, all the ratings were "Very good" and the overall ratings thereof were "Very good".

Comparative Examples 1 to 8

Cables in Comparative examples 1 to 8 were produced in the same manner as in Example 1, except that the compounding materials for the sheath in Example 1 were changed to those shown in Table 2.

In the same manner as in Example 1, the resulting cables were rated by the rating tests of each kind. The rated results are shown in Table 2.

TABLE 2

Table 2
(Unit of compounding amount is parts by mass)

| Item | Example Comparative example | | | | | | | |
|---|---|---|---|---|---|---|---|---|
| | 1 | 2 | 3 | 4 | 5 | 6 | 7 | 8 |
| EVA (VA amount: 46 mass %)[1] | 100 | | | | | | | |
| EVA (VA amount: 60 mass %)[2] | | | | | 100 | 100 | 100 | 100 |
| EVA (VA amount: 80 mass %)[3] | | 90 | 65 | 70 | | | | |
| Acid-modified polyolefin (Tg: −55° C. or lower)[6] | | 10 | 35 | | | | | |
| Acid-modified polyolefin (Tg: −50° C. or higher)[11] | | | | 30 | | | | |
| Silicon rubber[7] | 5 | 5 | 5 | 5 | 5 | 5 | 0 | 11 |
| Organic peroxide[8] | 2 | 2 | 2 | 2 | 2 | 2 | 2 | 2 |
| Magnesium hydroxide[9] | 100 | 100 | 100 | 100 | 90 | 260 | 100 | 100 |
| VA amount in base polymer (mass %) | 46 | 72 | 52 | 56 | 60 | 60 | 60 | 60 |
| Kneadability | Very good | Very good | Very good | Very good | Very good | Very good | Very good | Poor |
| Extrusion productivity | Good | Good | Good | Good | Good | Good | Good | Good |
| Presence/absence of die residue | Very good | Very good | Very good | Very good | Very good | Very good | Poor | Very good |
| Presence/absence of adherence | Very good | Very good | Very good | Very good | Very good | Very good | Poor | Very good |
| Flame retardancy | Poor | Very good | Very good | Very good | Poor | Very good | Very good | Very good |
| Tensile strength (MPa) | 13.5 | 12.4 | 13.8 | 13.9 | 11.2 | 13.5 | 12.0 | 9.9 |
| Rating | Very good | Very good | Very good | Very good | Very good | Very good | Very good | Poor |
| Oil resistance (%) | 45 | 5 | 42 | 35 | 20 | 18 | 25 | 20 |
| Rating | Poor | Very good | Poor | Very good | Very good | Very good | Very good | Very good |
| Low-temperature property (%) | 82 | 15 | 80 | 27 | 55 | 23 | 45 | 53 |
| Rating | Very good | Poor | Very good | Poor | Very good | Poor | Very good | Very good |
| Overall rating | Poor | Poor | Poor | Poor | Poor | Poor | Poor | Poor |

[1] to [3],[6] to [9] the same as in Examples
[11] Arkema, OREVAC G 18211

As shown in Table 2, in Comparative example 1, the VA content in the base polymer was low, and the flame retardancy and the oil resistance were "Poor". Therefore, the overall rating thereof was "Poor".

In Comparative example 2, the VA content in the base polymer was high, and the low temperature properties were "Poor". Therefore, the overall rating thereof was "Poor".

In Comparative example 3, the added amount of the acid modified polyolefin was too large, and the oil resistance was "Poor". Therefore, the overall rating thereof was "Poor".

In Comparative example 4, the Tg of the acid modified polyolefin was high, and the low temperature properties were "Poor". Therefore, the overall rating thereof was "Poor".

In Comparative example 5, the added amount of the magnesium hydroxide was low, and the flame retardancy was "Poor". Therefore, the overall rating thereof was "Poor".

In Comparative example 6, the added amount of the magnesium hydroxide was large, and the low temperature properties were "Poor". Therefore, the overall rating thereof was "Poor".

In Comparative example 7, no silicone rubber was added, and the die residue occurred, and the cable was sticky as well. Therefore, the overall rating thereof was "Poor".

In Comparative example 8, the added amount of the silicone rubber was large, and the tensile strength lowered. Therefore, the overall rating thereof was "Poor".

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A halogen-free crosslinked resin composition, consisting of:
    a base polymer including as a main component (a) an ethylene vinyl acetate copolymer and (b) an acid modified polyolefin resin having a differential scanning calorimetry glass transition temperature Tg of not higher than −55 degrees Celsius in a mass ratio (a):(b) of 70:30 to 90:10, the base polymer including 50 to 70% by mass of vinyl acetate;
    0.5 to 10 parts by mass of a silicone rubber with respect to 100 parts by mass of the base polymer; and
    100 to 250 parts by mass of a metal hydroxide with respect to 100 parts by mass of the base polymer,
    wherein the acid modified polyolefin resin has a melting point of not more than 90 degrees Celsius.

2. The halogen-free crosslinked resin composition, according to claim 1, wherein the ethylene vinyl acetate copolymer comprises two or more kinds of ethylene vinyl acetate copolymers which are different in melt mass flow rate, and
    wherein 5% to 20% by mass of the ethylene vinyl acetate copolymer has a melt mass flow rate of not less than 15 g/10 min.

3. The halogen-free crosslinked resin composition, according to claim 1, wherein 5% to 20% by mass of the ethylene vinyl acetate copolymer has a melt mass flow rate of not less than 15 g/10 min.

4. The halogen-free crosslinked resin composition, according to claim 1, wherein the ethylene vinyl acetate copolymer comprises two or more kinds of ethylene vinyl acetate copolymers which are different in melt mass flow rate, and
wherein 5% to 15% by mass of the ethylene vinyl acetate copolymer has a melt mass flow rate of not less than 15 g/10 min.

5. The halogen-free crosslinked resin composition, according to claim 1, wherein the ethylene vinyl acetate copolymer comprises two or more kinds of ethylene vinyl acetate copolymers which are different in melt mass flow rate, and
wherein 5% to 10% by mass of the ethylene vinyl acetate copolymer has a melt mass flow rate of not less than 15 g/10 min.

6. The halogen-free crosslinked resin composition, according to claim 1, wherein the acid modified polyolefin resin comprises an acid modified compound of at least one of ultra-low density polyethylene, ethylene methyl acrylate copolymer, ethylene ethyl acrylate copolymer, ethylene-butene-1 copolymer, ethylene-hexene-1 copolymer, and ethylene-octene-1 copolymer.

7. The halogen-free crosslinked resin composition, according to claim 6, wherein an acid that is used in the acid modified polyolefin resin comprises one of maleic acid, maleic anhydride, and fumaric acid.

8. The halogen-free crosslinked resin composition, according to claim 1, wherein an acid that is used in the acid modified polyolefin resin comprises one of maleic acid, maleic anhydride, and fumaric acid.

9. The halogen-free crosslinked resin composition, according to claim 1, wherein the silicone rubber is in a range from 0.5 to 7.5 parts by mass with respect to 100 parts by mass of the base polymer.

10. The halogen-free crosslinked resin composition, according to claim 1, wherein the silicone rubber is in a range from 0.5 to 5 parts by mass with respect to 100 parts by mass of the base polymer.

11. The halogen-free crosslinked resin composition, according to claim 10, wherein the mass ratio (a):(b) is in a range from 80:20 to 90:10.

12. The halogen-free crosslinked resin composition, according to claim 1, wherein the silicone rubber comprises one of dimethyl polysiloxane, methyl vinyl polysiloxane, and methyl phenyl polysiloxane.

13. The halogen-free crosslinked resin composition, according to claim 1, wherein the metal hydroxide is in a range from 100 to 150 parts by mass of with respect to 100 parts by mass of the base polymer.

14. The halogen-free crosslinked resin composition, according to claim 1, wherein the mass ratio (a):(b) is in a range from 80:20 to 90:10.

15. An insulated wire covered with an insulating layer comprising the halogen-free crosslinked resin composition according to claim 1.

16. An insulated wire covered with an insulating layer comprising the halogen-free crosslinked resin composition according to claim 2.

17. A cable comprising the insulated wire according to claim 15.

18. A cable comprising the insulated wire according to claim 16.

19. A cable covered with a sheath comprising the halogen-free crosslinked resin composition according to claim 1.

20. A cable covered with a sheath comprising the halogen-free crosslinked resin composition according to claim 2.

* * * * *